US006793218B2

(12) United States Patent
Pickett

(10) Patent No.: US 6,793,218 B2
(45) Date of Patent: Sep. 21, 2004

(54) FAST INKJET PRINTER HAVING MULTIPLE OUTPUT TRAYS

(75) Inventor: Charles Michael Pickett, Brush Prairie, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/256,378

(22) Filed: Sep. 26, 2002

(65) Prior Publication Data

US 2003/0030209 A1 Feb. 13, 2003

Related U.S. Application Data

(62) Division of application No. 09/645,867, filed on Aug. 24, 2000, now Pat. No. 6,481,711.

(51) Int. Cl.[7] .................................................. B65G 29/00
(52) U.S. Cl. ........................... 271/279; 271/3.01; 270/1
(58) Field of Search ................................ 271/3.01, 298, 271/279; 270/1, 58.18, 58.01

(56) References Cited

U.S. PATENT DOCUMENTS 4,727,402 A * 2/1988 Smith ......................... 399/368
4,844,633 A 7/1989 Greenberg
4,913,426 A * 4/1990 Kaneko ...................... 271/296
4,925,176 A * 5/1990 Acquaviva ................. 271/3.03
5,980,141 A 11/1999 Donnis

* cited by examiner

*Primary Examiner*—Christopher P. Ellis
*Assistant Examiner*—Richard Ridley
(74) *Attorney, Agent, or Firm*—Robert D. Varitz, P.C.

(57) ABSTRACT

An output mechanism for use with an inkjet printer for printing a multi-page document, including plural paper-receiving output trays; a controller for determining the total number of pages, the number of copies of each page to be printed, and the paper-receiving tray which will receive each printed page, wherein each page is provided with sufficient time to dry before a subsequently printed page is stacked on top thereof; and a paper directing mechanism for directing the paper to a specific paper-receiving tray.

3 Claims, 2 Drawing Sheets

FAST INKJET PRINTER HAVING MULTIPLE OUTPUT TRAYS

RELATED APPLICATION

This Application is a Division of Ser. No. 09/645,867, filed Aug. 24, 2000, now U.S. Pat. No. 6,481,711 B1, granted Aug. 24, 2003.

FIELD OF THE INVENTION

This invention relates to inkjet printer peripherals, and specifically to a fast output inkjet device.

BACKGROUND OF THE INVENTION

Known office laser printers and copiers can print at 60-ppm+. However, inkjet printers are limited to single digit speeds, as modern office inkjet printers do not normally print faster than 7-ppm. The speed of inkjet printers is limited by the dry time of the ink. After a page is printed, another page cannot be dropped onto the first printed page until the ink on the first page is sufficiently dry. It is unlikely that workgroup inkjet printers will become an office standard until a breakthrough in printer speed occurs.

Although multiple output trays are provided on some office laser printers, the provisions of such multiple output trays are for reasons other than increasing print speed. Multiple trays may be provided on a laser printer/copier to allow sorting of multiple jobs. No office inkjet printer uses multiple output trays.

Known solutions to the dry-time limitation of inkjet printers include providing a heater to shorten dry time, as are found in the Hewlett-Packard (HP) DeskJet 1200C and 1600C: using a driver to delay printing the second page, which is a default setting for virtually all inkjet printers when operated in "Best Mode;" and providing mechanical devices to support subsequently printed pages above the level of previously printed pages for a period of time, allowing the ink to dry on the first printed page. These devices include the "wings" found on the output trays of all HP DeskJets. None of these solutions has led to a breakthrough to double-digit speeds.

U.S. Pat. No. 4,844,633 to Greenberg, granted Jul. 4, 1989, for Active paper drop mechanism for a printer, describes and support mechanism which includes a pair of arms which intercept a page as it is output from the printer, and momentarily supports the page to provide additional dry time for the immediately underlying page.

U.S. Pat. No. 5,980,141 to Donnis, granted Nov. 9, 1999, for Ink jet printer for delaying the stacking of the printed sheets and associated method of operation, describes a delay mechanism which interrupt paper flow when two sequentially printed pages are within a predetermined distance on one another.

SUMMARY OF THE INVENTION

An output mechanism for use with an inkjet printer for printing a multi-page document, including plural paper-receiving output trays; a controller for determining the total number of pages, the number of copies of each page to be printed, and the paper-receiving tray which will receive each printed page, wherein each page is provided with sufficient time to dry before a subsequently printed page is stacked on top thereof; and a paper directing mechanism for directing the paper to a specific paper-receiving tray.

It is an object of this invention to increase inkjet output speed.

Another object of the invention is to allow ink on a first printed page to be sufficiently dry before a subsequently printed page is stacked on the first printed page.

A further object of the invention is to provide an output mechanism for use with an inkjet printer which includes multiple output trays and alternating output distribution between the multiple output trays.

This summary and objectives of the invention are provided to enable quick comprehension of the nature of the invention. A more thorough understanding of the invention may be obtained by reference to the following detailed description of the preferred embodiment of the invention in connection with the drawings.

DETAILED DESCRIPTION OF THE PREFERRED EMBODIMENT

The invention uses multiple output trays, and appropriate additions to the printer controller, to increase the speed of office ink jet printers and inkjet printers in multifunction peripherals (MFPs). The invention provides multiple output trays to allow increased printer output speed. With two output trays, output speed may be effectively doubled; with three trays, output speed may be effectively tripled, etc.

Figure 1:
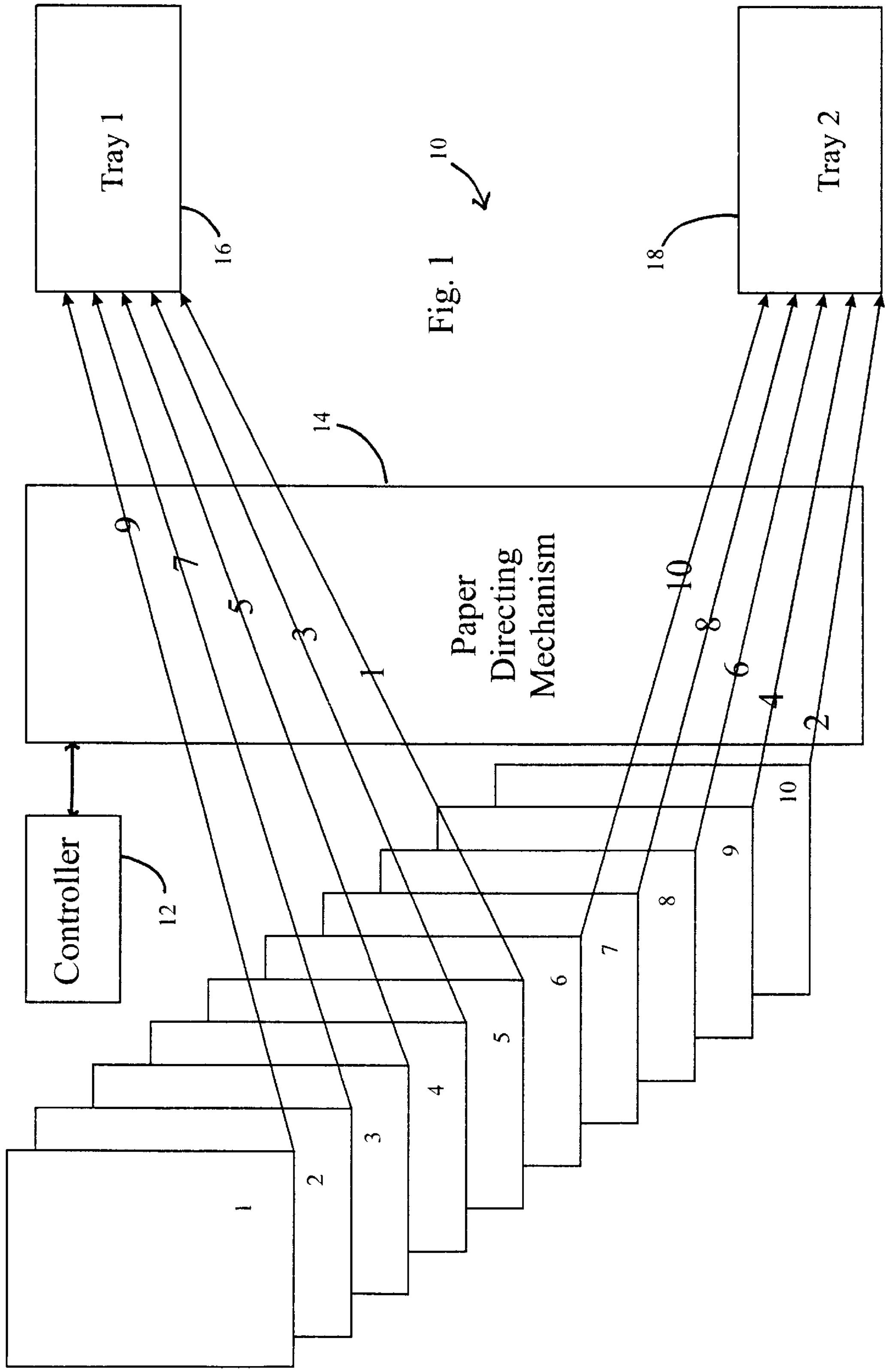
FIG. 1 depicts single copy output of the invention.

In a two-tray embodiment of the invention, a first output page is sent to one of the output trays, and a second page is sent to another output tray, allowing the first page sufficient time to dry in its output tray. After receiving an entire print job in a buffer, the printer controller determines page print order and in which output tray each printed page is to be deposited. In the least complex embodiment, the user is responsible for emptying both output trays and collating the final document. As will become apparent, such collating usually requires no more than placing the providing two output trays is the most likely embodiment, due to economic considerations. Accordingly, the examples provided herein include two output trays. Referring now to FIG. 1, in the two-tray embodiment, shown generally at 10, a software controller 12 analyzes a print job sent to the printer and directs the number of pages to be printed to a paper directing mechanism 14, and routes printer output in a tray-filling scheme to maximize print speed. In the case of a ten page document, the controller sends the first half of the document to output tray one 16, and sends the second half of the document to output tray two 18. The print order is shown in Table 1.

TABLE 1

| Page of Document | Print Order | Output Tray |
|---|---|---|
| 1 | 10 | 2 |
| 2 | 8 | 2 |
| 3 | 6 | 2 |
| 4 | 4 | 2 |
| 5 | 2 | 2 |
| 6 | 9 | 1 |
| 7 | 7 | 1 |
| 8 | 5 | 1 |
| 9 | 3 | 1 |
| 10 | 1 | 1 |

When the print job is completed, the user merely collates the two halves of the document.

Figure 2:
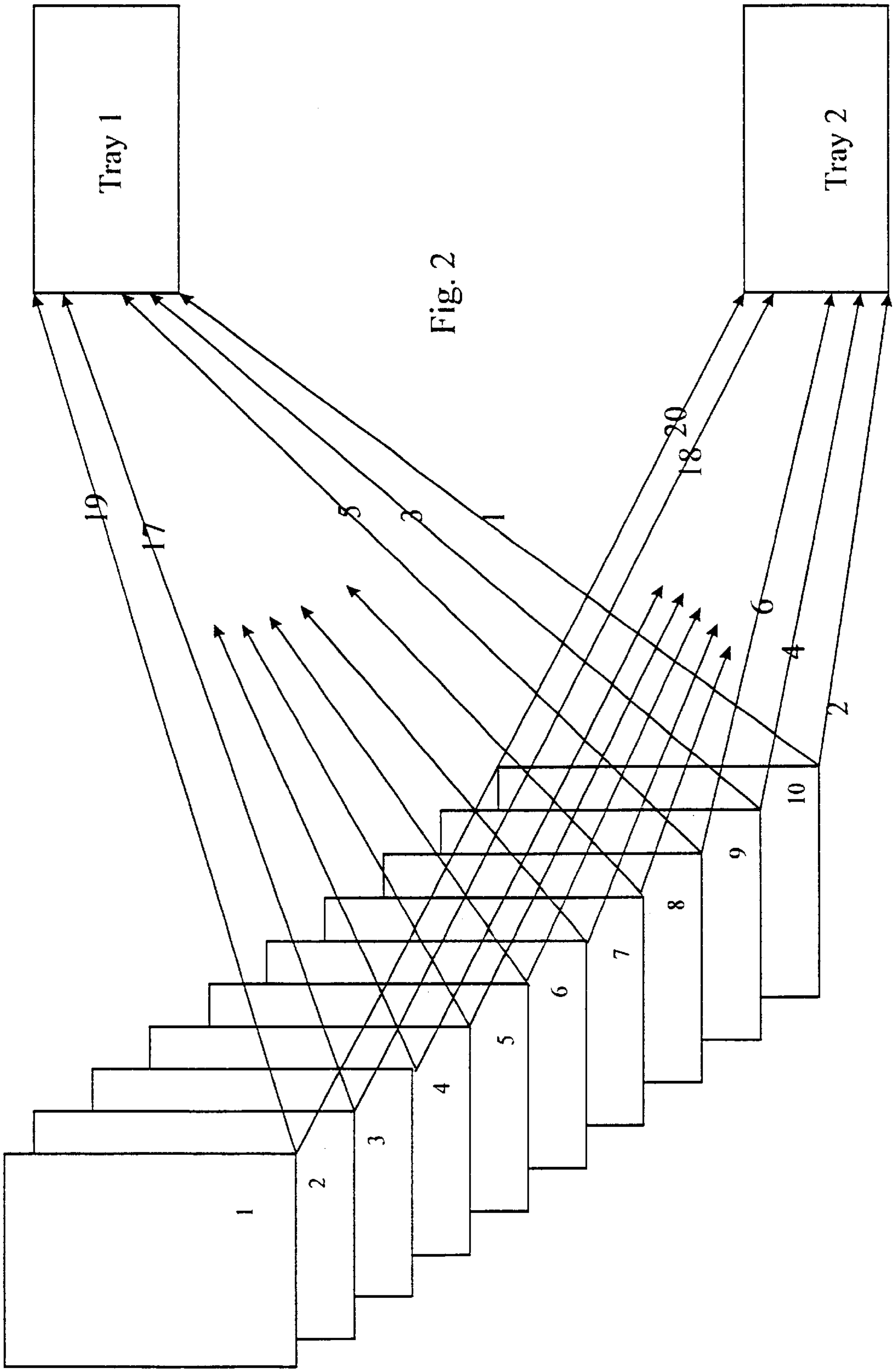
FIG. 2 depicts multiple copy output of the invention.

In the case of an even number of copies of a single document, the controller counts the number of copies and prints the even numbered documents in one tray and the odd numbered documents in the other tray. For example, if the user requests two copies of a ten page the number of copies and prints the even numbered documents in one tray and the odd numbered documents in the other tray. For example, if the user requests two copies of a ten page document, the controller prints the job as shown in FIG. 2. The print order is shown in Table 2:

TABLE 2

| | Copy One | | Copy Two | |
|---|---|---|---|---|
| Document Page | Print Order | Output Tray | Print Order | Output Tray |
| 1 | 19 | 2 | 20 | 1 |
| 2 | 17 | 2 | 18 | 1 |
| 3 | 15 | 2 | 16 | 1 |
| 4 | 13 | 2 | 14 | 1 |
| 5 | 11 | 2 | 12 | 1 |
| 6 | 9 | 2 | 10 | 1 |
| 7 | 7 | 2 | 8 | 1 |
| 8 | 5 | 2 | 6 | 1 |
| 9 | 3 | 2 | 4 | 1 |
| 10 | 1 | 2 | 2 | 1 |

At the completion of the print job, the documents are in sort-order, with one copy of the document in the first output tray and the second copy of the document in the second output tray. If an even number of copies is requested, subsequent copies are printed and stacked in the two output trays following the protocol of FIG. 2 and Table 2. In the case of an odd number of copies, printing proceeds as though an even number of copies are being printed. The final (odd) copy is printed as though it were a single copy print job, using the print order of Table 1.

The output mechanism of the invention may be incorporated in any output device using inkjet technology. This includes copiers, fax machines, and MFP's. Due to the cost of additional output trays, the application will be primarily to shared devices.

Thus, a system for an inkjet output mechanism has been disclosed. It will be appreciated that further variations and modifications thereof may be made within the scope of the invention as defined in the appended claims.

I claim:

1. An output mechanism for use with an inkjet printer for printing a multi-page document, comprising:

plural paper-receiving output trays, n;

a controller for determining the total number of pages, the number of copies of each page to be printed, and the paper-receiving tray which will receive each printed page, wherein each printed page is provided with sufficient time to dry before a subsequently printed page is stacked on top thereof; and a paper directing mechanism for directing a printed page to a specific paper-receiving output tray; wherein a multiple copy output is printed last page first, and wherein each copy of a multiple copy output is input to a single one of n output trays.

2. The output mechanism of claim 1 wherein, where n is an even number, for an odd number of multiple copies, an even number of copies is printed into a single output tray, and the final copy is printed last-half into one of the output trays, and first-half pages into another output tray, wherein, for said final copy, printing of pages Page 4 Response to Office Action under 37 C.F.R. § 1.111 for Ser. No. 10/256,378 alternates between said last-half pages and said first half pages.

3. An output mechanism for use with an inkjet printer for printing a multi-page document, comprising:

two paper-receiving output trays;

a controller for determining the total number of pages, the number of copies of each page to be printed, and the paper-receiving tray which will receive each printed page, wherein each printed page is provided with sufficient time to dry before a subsequently printed page is stacked on top thereof; and a paper directing mechanism for directing a printed page to a specific paper-receiving output tray; wherein a multiple copy output is printed last page first, and wherein, for an even number of multiple copy output, each copy of the multiple copy output is input to a single output tray, and wherein for an odd number of copies, an even number of copies is printed into each output tray, and the final copy is printed last-half into one of the output trays, and first-half pages into the other output tray, wherein printing of pages alternates between said last-half pages and said first half pages.

* * * * *